Figure 1:
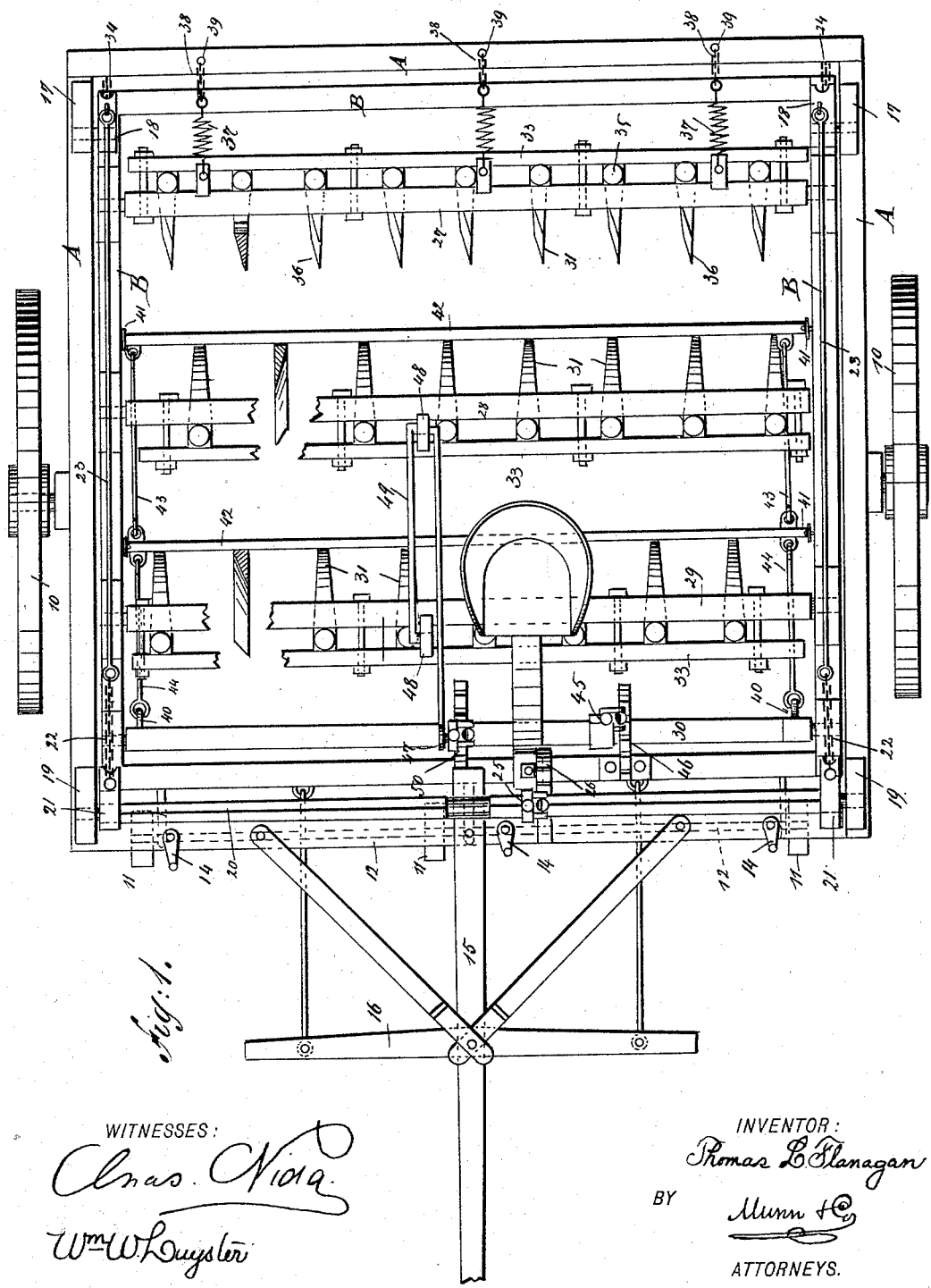

(No Model.) 2 Sheets—Sheet 1.

T. L. FLANAGAN.
COMBINED HARROW AND CUTTER.

No. 442,031. Patented Dec. 2, 1890.

WITNESSES:
Chas. N. Dia
Wm W Duyster

INVENTOR:
Thomas L. Flanagan
BY
Munn & Co
ATTORNEYS.

(No Model.) 2 Sheets—Sheet 2.
T. L. FLANAGAN.
COMBINED HARROW AND CUTTER.
No. 442,031. Patented Dec. 2, 1890.
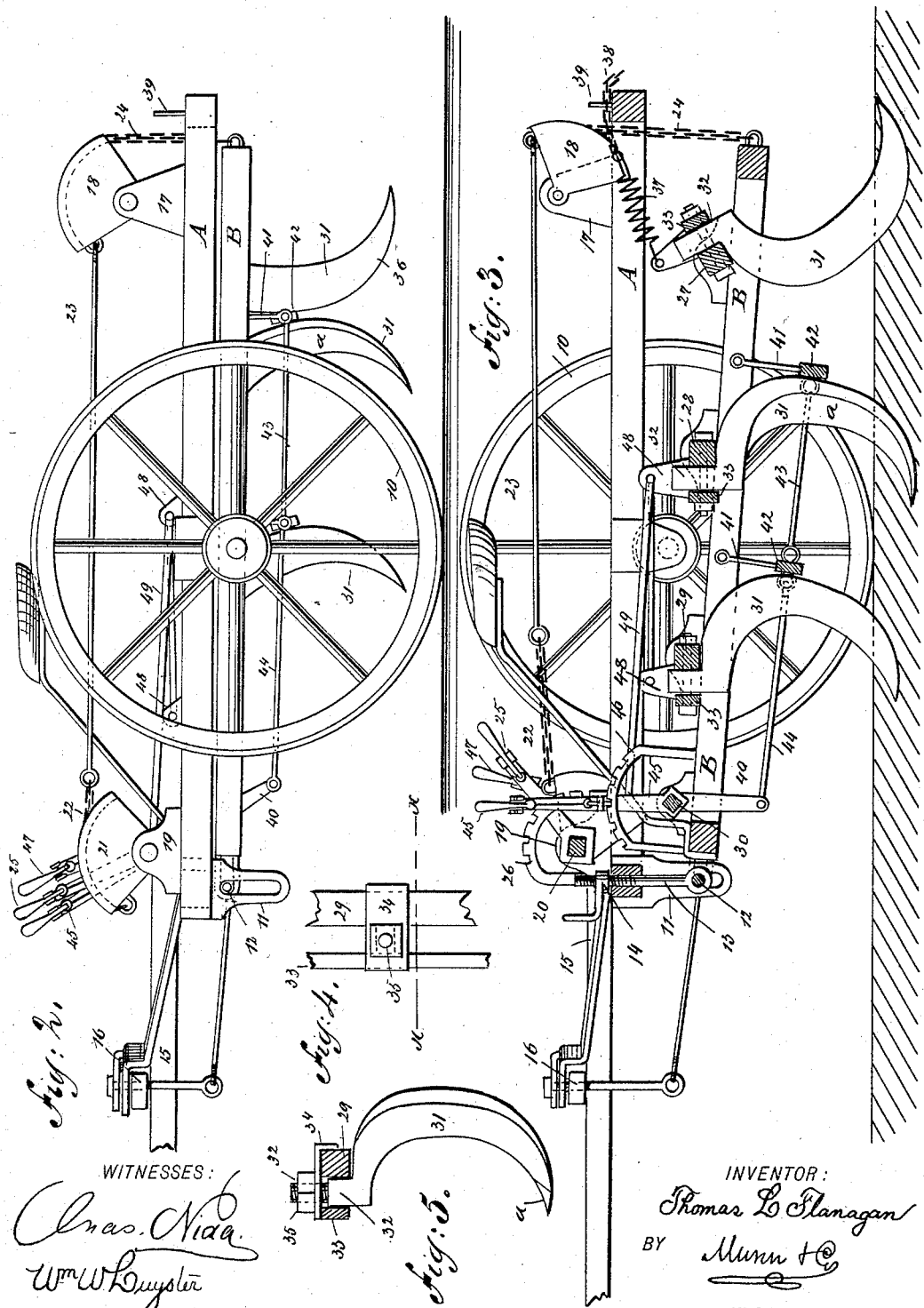
WITNESSES:
Chas. Nida
Wm W Duyster
INVENTOR:
Thomas L Flanagan
BY Munn &Co
ATTORNEYS.

UNITED STATES PATENT OFFICE.

THOMAS L. FLANAGAN, OF VICKSBURG, MISSISSIPPI.

COMBINED HARROW AND CUTTER.

SPECIFICATION forming part of Letters Patent No. 442,031, dated December 2, 1890.

Application filed September 23, 1889. Serial No. 324,745. (No model.)

*To all whom it may concern:*

Be it known that I, THOMAS L. FLANAGAN, of Vicksburg, in the county of Warren and State of Mississippi, have invented a new and Improved Combined Harrow and Cutter, of which the following is a full, clear, and exact description.

My invention relates to a combined harrow and cutter capable of use as a rake or cultivator, and has for its object to provide an implement of simple and durable construction which can be expeditiously and conveniently manipulated.

The invention consists in the novel construction and combination of the several parts, as will be hereinafter fully set forth, and pointed out in the claims.

Reference is to be had to the accompanying drawings, forming a part of this specification, in which similar letters and figures of reference indicate corresponding parts in all the views.

Figure 1 is a plan view of the implement, portions being broken away. Fig. 2 is a side elevation of the same, illustrating the teeth as elevated. Fig. 3 is a central vertical section illustrating the teeth lowered. Fig. 4 is a partial plan view of one of the teeth-carrying spindles, illustrating the attachment of the teeth thereto; and Fig. 5 is a section on line $x\,x$ of Fig. 4.

In the construction of the implement two frames are employed—namely, the outer or main frame A and the inner suspended frame B. From opposite sides of the main frame stud-axles are projected, upon which axles drive-wheels 10 are held to revolve, and from the front cross-bar of the frame B a series of hangers 11 are downwardly projected, each provided with a longitudinal slot, the said slots being adapted to receive a bar 12, which extends from side to side of the main frame. The bar 12 is capable of being raised and lowered through the medium of upright rods 13, attached thereto at intervals, which rods are projected upward through and beyond the front cross-bar of the main frame, being threaded at their upper outer ends and provided at said ends with a nut 14, having a handle attached, as best shown in Fig. 3. To this front cross-bar of the main frame at or near the center the tongue 15 of the implement is secured, having pivoted thereon the usual doubletree 16.

At each rear corner of the main frame A a vertical standard 17 is secured, and upon the inner face of each of said standards a segmental grooved pulley 18 is pivoted. A standard 19 is also projected upward from each forward end of the main frame, and in said standards 19 the extremities of a shaft 20 are journaled, said shaft being provided at or near its ends with segmental grooved pulleys 21, which pulleys are in horizontal alignment with the pulleys 18 at the rear of the frame. To the forward end of each of the forward pulleys 21 one end of a chain 22 is firmly secured, the other end of said chains being attached to links 23, which links are fastened at their rear ends to the forward side of the rear segmental pulleys 18, as illustrated in Figs. 2 and 3.

The inner frame B is suspended within the outer or main frame A in the following manner: The forward cross-bar of the inner suspension-frame B is hinged or pivotally attached in any suitable or approved manner to the adjustable rod 12 of the main frame. This hinged or pivotal connection is usually effected by securing to the front cross-bar of the inner frame a series of eyes through which the said adjustable rod passes. The other point of attachment of the inner to the outer frame is made at the rear corners of the latter, and is effected by attaching to the said corners one end of a length of chain 24, the other end of the chains being carried upward over the groove in the segmental pulleys 18 to a rigid attachment therewith at or near the point where the links 23 are secured to the said pulleys. By means of the link-and-chain connections 22, 23, and 24 the inner frame is raised and lowered, the same being accomplished through the medium of a lever 25, firmly secured to the shaft 20, which lever is made to contact with a suitable rack 26, attached to the main frame, the lever 25 to that end being provided with the usual form of grip-latch.

Upon the inner suspension-frame B a series of transverse spindles or shafts 27, 28, 29, and 30 are journaled, the spindles 27, 28, and 29 being designed to support teeth, to be hereinafter described. A series of teeth 31 is attached to the several spindles 27, 28, and 29, the said teeth being best illustrated in Figs. 3 and 5. The teeth are formed in the shape of a sickle, the shank 32 being rectangular, and the said teeth are usually held in contact with the spindles by introducing the shanks between said spindles and a bar 33, which extends parallel with each spindle from end to end, as best shown in Fig. 1, the shanks of the teeth being clamped between the bars 33 and the spindles by passing bolts through said bars and spindles, which bolts are provided with suitable lock-nuts, whereby the bars may be loosened to remove any one or more of the teeth, as occasion may demand, or to sharpen the same. These teeth 31 are beveled upon one side, as illustrated at $a$ in Fig. 3, and the point of each tooth carried by the spindles 28 and 29 is flat, as illustrated at $a'$ in Fig. 5, whereby the said points will readily enter the ground. The beveled side faces of the teeth upon the spindles 28 and 29 are so placed that the teeth upon the forward spindle 29 will throw the dirt to the right and the teeth upon the spindle 28 will throw the dirt to the left, whereby as the implement is in operation the teeth will not be clogged.

In order to remove the strain or tension from the spindles necessarily exerted thereon when the teeth are in the ground, I prefer to thread the upper projecting portion of the shank 32 of the teeth and passing over each of the said shanks an angle-plate 34, as shown in Fig. 5, which plate rests transversely upon both the spindle and its connecting-bar 33, one member of the plate being made to contact with one side face of the spindle. A nut 35 is screwed upon the shank 32 of the teeth to a bearing upon the plate, whereby the latter is firmly held to place.

Between the rear spindle 27 and its bar 33 the sickle-teeth are so placed that their convexed edges will face to the front, and the teeth upon the intermediate spindles 28 and 29 are placed so that their concaved edges face forward, and the convexed edge of each tooth attached to the rear spindle 27 is sharpened or brought to a knife-edge, as illustrated at 36 in Fig. 1. By reference to the same figure it will be observed that one side face of said teeth is beveled to throw the dirt to the right.

The set of teeth attached to the spindle 27 act as pulverizers, in that they cut the dirt thrown in their track by the teeth upon the intermediate spindles, and the spindle to which the rear pulverizing-teeth is attached is held in position by springs 37, secured to standards projected upward from the spindle, the rear end of said springs having a length of chain 38 secured thereto, which chains are attached to pins 39 upon the rear cross-bar of the main frame, as shown in Fig. 3. These springs are especially adapted to permit the teeth to pass over any wood or rocks that may be in their path when the harrow is dumped, and by attaching the chains 38 to the springs the latter may be lengthened or shortened as the advanced teeth are set to work deep or shallow.

From each end of the forward spindle 30 an arm 40 is projected downward, and between the several rows of teeth links 41 are pivoted to the side bars of the pendent or inner frame, the said links 41 being secured to the ends of transverse brace-bars 42, one of which bars is made to essentially contact with the convexed rear edge of the intermediate sets of teeth at or near their centers, and the several brace-bars are connected at their ends to each other by a link 43, as shown in Fig. 3, and to the arms 40 by similar links 44. Upon the spindle 30 a lever 45 is rigidly fastened, having an attached grip-latch capable of contact with a rack 46, attached to the inner frame, as shown in Fig. 3. Upon this spindle 30, preferably at one side of its center, the lower end of a lever 47 is loosely mounted, and from between the intermediate spindles and their parallel bars 33 standards 48 are upwardly projected, a connection being effected between the said standards and the lever 47 by a bar 49, secured at one end to the forward standard 48 and passed through the rear standard of the central tooth-spindle to a connection with the said lever 47, as best shown in Fig. 1. This lever 47 is also provided with the usual form of hand-latch, which contacts with a rack 50.

When used as a harrow only, all the teeth being elevated, to lower the inner frame the lever 25, attached to the rock-shaft 20, is carried to the rear, and as the frame drops the rear set of pulverizing-teeth assume a rearward inclination, as shown in Fig. 3. Immediately upon dropping the frame the lever 47 is also carried to the rear, which gives a forward inclination to the rows of forward or intermediate teeth through the rod-connection 49. The lever 45 is then carried rearward and secured to its rack, which movement of the lever forces each of the brace-bars 42 to a contact with the rows of forward and intermediate teeth, whereby should the latter encounter any obstruction they are not liable to be broken, as they have a firm bearing and support at their back by contacting with the said brace-bars.

The implement may be used as a cultivator by removing two of the middle teeth from the spindles 28 and 29 and raising the rear set of pulverizer-teeth. As a harrow the teeth are intended to enter the soil about twelve inches or as deep as the ground is broken. When used as a rake, the rear set of teeth is also preferably removed.

Having thus described my invention, I claim as new and desire to secure by Letters Patent—

1. In an agricultural implement, the combination, with a main frame and an inner frame capable of being raised and lowered, of a series of spindles or rock-shafts journaled upon the inner frame, a series of sickle-like teeth secured to the forward shafts or spindles, having their concaved surfaces facing forward, and a series of similarly-shaped teeth attached to a rear spindle, having their convexed edges sharpened and facing to the front, substantially as shown and described.

2. In an agricultural implement, the combination, with a main frame and an inner frame attached thereto capable of being raised and lowered, of a series of spindles or rock-shafts journaled upon the said inner frame, sickle-shaped teeth secured to said spindles, having one side face beveled, and brace-bars capable of being raised and lowered arranged at the rear of each set of teeth, substantially as and for the purpose specified.

3. In an agricultural implement, the combination, with a main frame, an inner frame attached thereto capable of being raised and lowered, and a series of rock-shafts journaled upon the inner frame, of a series of sickle-teeth secured to the forward and intermediate rock-shafts, having the side face of one set of teeth beveled to throw the dirt to the right and the other set to throw the dirt to the left, and the concaved surface of said teeth being made to face forward, and a series of similarly-shaped teeth secured to the rear rock-shaft, having one side face beveled and their convexed edges sharpened and faced to the front, substantially as shown and described.

4. In an agricultural implement, the combination, with a main frame, an inner frame attached thereto capable of being raised and lowered, and a series of rock-shafts journaled upon the inner frame, of a series of sickle-shaped teeth secured to the forward and intermediate rock-shafts, having the side face of one set of teeth beveled to throw the dirt to the right and the other set to throw the dirt to the left, the concaved surface of said teeth being made to face forward, a series of similarly-shaped teeth secured to the rear rock-shaft, having one side face beveled and their convexed edges sharpened and faced to the front, springs connecting the rear rock-shaft with the main frame, a brace-bar held to contact with the rear or convexed surfaces of the intermediate and forward teeth, and means, substantially as shown and described, for raising and lowering the brace-bars and elevating and depressing the inner frame, substantially as and for the purpose specified.

5. The combination, with a main frame provided with slotted hangers and a vertically-adjustable bar held in said hangers, of an inner frame hinged to said bar at its forward end, a shaft 20, journaled on the main frame and provided with a lever, segmental pulleys 21, carried by said shaft, other segmental pulleys 18, carried by the main frame, and connections between said sets of pulleys and between the pulleys 18 and the rear end of the main frame, substantially as shown and described.

THOMAS L. FLANAGAN.

Witnesses:
   EDWARD N. DORSEY,
   FRANK BEDFORD.